Feb. 1, 1966           R. AGLE           3,232,215
METHOD AND APPARATUS FOR MARKING A BALE OF HAY
Filed Aug. 5, 1964
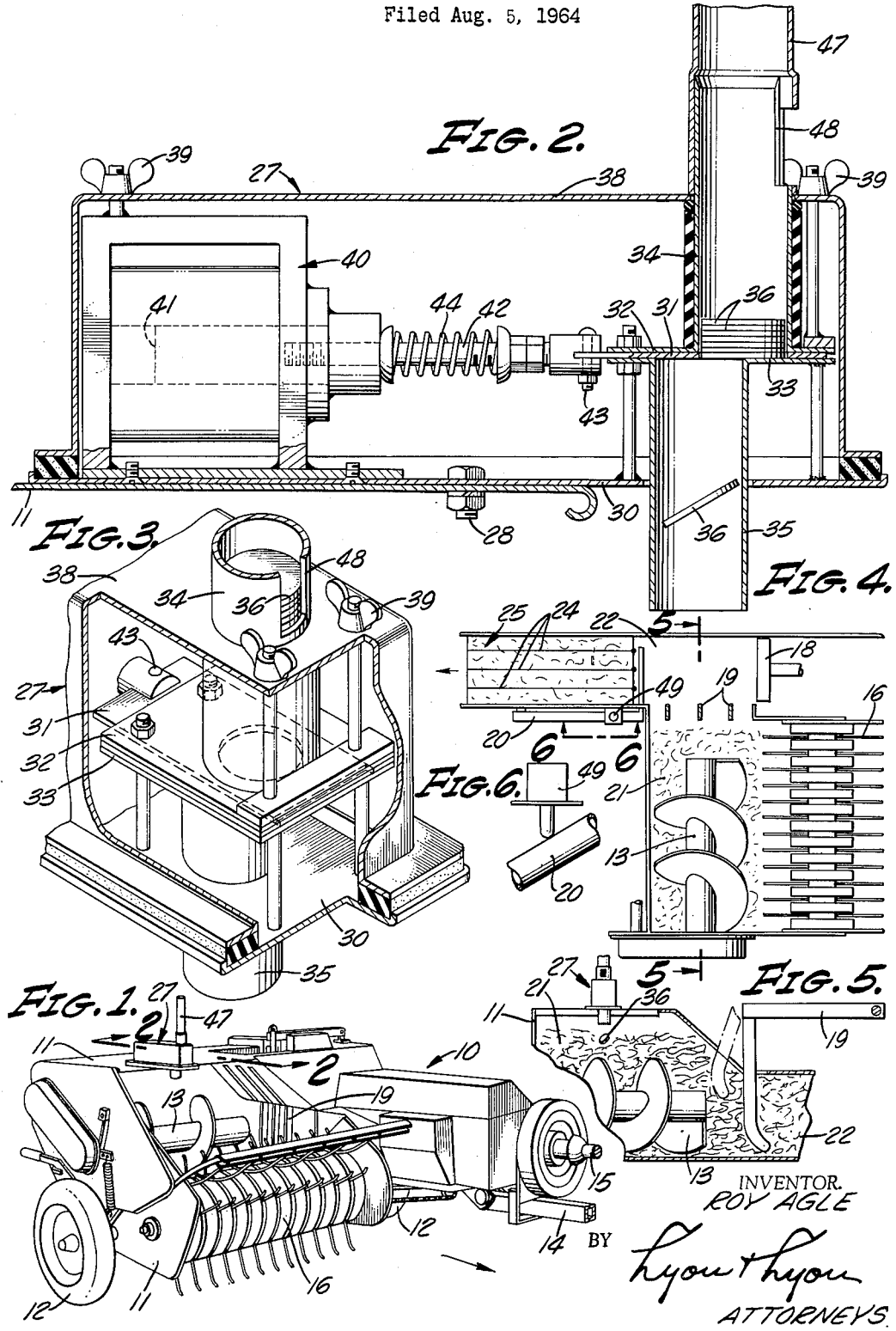
INVENTOR.
ROY AGLE

United States Patent Office 3,232,215
Patented Feb. 1, 1966

3,232,215
METHOD AND APPARATUS FOR MARKING
A BALE OF HAY
Roy Agle, Bakersfield, Calif., assignor to Kern County Equipment Company, Inc., Bakersfield, Calif., a corporation of Nevada
Filed Aug. 5, 1964, Ser. No. 387,727
6 Claims. (Cl. 100—3)

The need for an identification marker arises in several different situations. For example, theft of bales of hay may be difficult to prove because all bales of hay look very much alike. Marking of the wire loops which encircle each bale of hay is not a satisfactory solution to the problem because the identifying marks can be removed or obliterated. As an example of another situation where identification marking of bales of hay is desirable, a dairy owner may wish to locate the source of hay which has been found to contain impurities, such as, for example, excess amounts of insecticides. When such hay is fed to cows, the milk produced may not be suitable for sale to the trade. If the dairy owner buys the hay from a number of different sources, it may not be possible to identify the particular source of the unacceptable bales.

In accordance with this invention, an identification marker is placed inside each bale of hay as it is formed in the hay baler device. The marker is placed in the moving stream of loose-cut hay, just prior to the time that the hay enters the compaction chamber. The marker is concealed within the outline of the bale of hay, but it may readily be located by removing the wire bands and then spreading out the hay from its compacted form. The marker is formed of material which will not adversely affect the digestive system of a cow, and in practice it is preferred to use conventional cardboard milk-bottle tops printed with identifying information. Such markers are readily available in quantity and at low cost.

Other and more detailed objects and advantages will appear hereinafter.

In the drawings:

FIGURE 1 is a perspective view of a conventional hay baler device, showing location of a dispenser for dropping identification markers into the stream of loose-cut hay as it moves toward the compaction chamber.

FIGURE 2 is a sectional elevation showing details of the dispenser.

FIGURE 3 is a perspective view partly broken away, showing additional details of the dispenser.

FIGURE 4 is a plan view in diagrammatic form, showing relative positions of the screw conveyor, compaction chamber, reciprocating ram, and wire-tie mechanism.

FIGURE 5 is a transverse sectional view, taken substantially on the lines 5—5 as shown in FIGURE 4.

FIGURE 6 is a fragmentary detail, taken substantially on the lines 6—6 as shown in FIGURE 4.

Referring to the drawings, the hay baler device 10 is conventional in form and may include a frame 11 supported on wheels 12 and having a transverse horizontal rotary conveyor screw 13. A tongue 14 pivoted to the frame 11 extends forward for connection to a towing vehicle, not shown. A power take-off shaft 15 driven from the towing vehicle supplies power to various components of the baler device 10. Power is thus supplied to the rotary pickup unit 16 for picking up loose-cut hay in the field, and power is also supplied to rotate the conveyor screw 13. A reciprocating ram 18, an oscillating fork member 19, and a wire-tie mechanism 20 are also driven from the power take-off shaft 15. Loose hay picked up from the field by the unit 16 is moved laterally in a continuous stream 21 by the constantly rotating screw conveyor 13. Movement of the stream 21 into the compaction chamber is assisted by the oscillating fork 19, driven in timed relationship with the mechanism 20 which extends wire bands 24 around the bale 25 after it has been compacted by the reciprocating ram 18. The ram 18, fork 19, and wire-tie mechanism 20 operate in timed relationship, as is conventional.

In accordance with this invention, a dispenser generally designated 27 is mounted on the frame 11 above the rotary screw conveyor 13 and in advance of the location of the fork member 19. The dispenser 27 is fixed to the frame 11 by suitable fastenings 28. The dispenser includes a base 30 having an apertured plate 31 mounted for horizontal movement between stationary flanges 32 and 33 on misaligned, vertical tubes 34 and 35, respectively. Marker elements 36 are mounted in the tube 34 and may be dispensed one by one by sliding the aperture plate 31 horizontally. The marker elements 36 preferably comprise cardboard milk-bottle tops which have the form of a flat, circular disk. Each is printed or otherwise marked with identifying information.

A dust-excluding cover 38 is mounted on the base 30 held in place by wing nuts 39. Within the chamber formed by the cover 38, there is mounted an electrical solenoid assembly 40, having a horizontally movable armature 41. A rod 42 connects the armature 41 to the apertured plate 31 by means of the pin 43. When electrical energy is supplied to the solenoid assembly 40, the armature 41 moves to the left, as viewed in FIGURE 2, thereby moving the aperture plate 31 from a position of alignment with the supply tube 34 to a position of alignment with the discharge tube 35. When the supply of electrical energy is cut off, the spring 44 returns the rod 42 and armature 41 and plate 31 to the initial position as shown in FIGURE 2. Accordingly, each time that the solenoid 40 is actuated, one of the marker elements 36 is discharged by gravity through the outlet tube 35. A supply of marker tubes may be provided in the inverted container 47, which rests on the upper end of the supply tube 34 and forms an extension thereof. A lateral window 48 provides visual indication of the supply of marker elements 36.

Electrical wires, not shown, connect the solenoid 40 to the actuating switch 49 mounted on the frame 11 and positioned to be contacted by a part which moves once each time a bale 25 of hay is formed. The wire-tie mechanism includes the pivoted bar 20, and the switch 49 is conveniently positioned to be contacted by the bar 20 each time it is raised to perform the wire-tie operation on the bale 25. This occurs automatically in timed sequence to reciprocation of the ram 18 and oscillating movement of the fork 19.

When the switch 49 is actuated by contact with the bar 20, the solenoid 40 moves the aperture plate 31 to cause gravity discharge of one of the marker elements to the outlet tube 35. The marker element falls into the laterally moving stream 21 of loose-cut hay as it is impelled toward the compaction chamber 22 by the rotary screw conveyor 13. The marker element becomes imbedded within the bale of hay, and its presence cannot be detected without opening up the bale.

Having fully described my invention, it is to be understood that I am not to be limited to the details herein set forth, but that my invention is of the full scope of the appended claims.

I claim:

1. For use with a hay baler device having a reciprocating ram, a compaction chamber, a rotary screw conveyor for delivering a stream of loose-cut hay to the compaction chamber, and a wire tie mechanism for bales of hay compacted by the ram, the improvement comprising: a dispenser having a cavity for reception of a plurality of identification markers, the dispenser having a movable element for controlling discharge of markers, means mounting the dispenser on the hay baler device in a position to discharge markers into the loose hay being moved by the screw conveyor toward the compaction chamber, and means for actuating the movable element of the dispenser in timed sequence with the movements of the wire tie mechanism.

2. For use with a hay baler device having a reciprocating ram, a compaction chamber, a rotary screw conveyor for delivering a stream of loose cut hay horizontally to the compaction chamber, and a wire tie mechanism for bales of hay compacted by the ram, the improvement comprising: a dispenser having a cavity for reception of a plurality of identification markers, the dispenser having a movable element for controlling gravity discharge of markers, means mounting the dispenser on the hay baler device in a position to discharge markers by gravity into the loose hay being moved by the screw conveyor toward the compaction chamber, and means for actuating the movable element of the dispenser in timed sequence with the movements of the wire tie mechanism.

3. For use with a hay baler device having a reciprocating ram, a compaction chamber, a rotary screw conveyor for delivering a stream of loose cut hay to the compaction chamber, a wire tie mechanism for bales of hay compacted by the ram, and an oscillating fork for crowding hay into the compaction chamber, the improvement comprising: a dispenser having a cavity for reception of a plurality of identification markers, the dispenser having a movable element for controlling discharge of markers, means mounting the dispenser on the hay baler device in a position to discharge markers into the loose hay being moved by the screw conveyor and in advance of the position of the oscillating fork, and means for actuating the movable element of the dispenser in timed sequence with the movements of the wire tie mechanism.

4. For use with a hay baler device having a reciprocating ram, a compaction chamber, a rotary screw conveyor for delivering a stream of loose-cut hay horizontally to the compaction chamber, a wire tie mechanism for bales of hay compacted by the ram, and an oscillating fork for crowding hay into the compaction chamber, the improvement comprising: a dispenser having a cavity for reception of a plurality of identification markers, the dispenser having a movable element for controlling gravity discharge of markers, means mounting the dispenser on the hay baler device in a position to discharge markers by gravity into the loose hay being moved by the screw conveyor and in advance of the position of the oscillating fork, and means including an electrical solenoid for actuating the movable element of the dispenser in timed sequence with the movements of the wire tie mechanism.

5. The method of positioning an identification marker within a bale of hay, comprising the steps of: continuously moving a stream of loose-cut hay toward a compaction chamber, forming individual bales of hay in the compaction chamber, intermittently extending loops of wire around each bale to maintain it in compacted form, and placing a marker element into the stream of loose-cut hay in timed sequence with extending the loops of wire.

6. The method of positioning an identification marker within a bale of hay, comprising the steps of: continuously moving a stream of loose-cut hay horizontally toward a compaction chamber, forming individual bales of hay in the compaction chamber, intermittently extending loops of wire around each bale to maintain it in compacted form, and dropping a marker element by gravity into the stream of loose-cut hay in timed sequence with extending the loops of wire.

References Cited by the Examiner

UNITED STATES PATENTS

| | | | |
|---|---|---|---|
| 1,066,467 | 7/1913 | Chenette | 100—44 |
| 2,131,843 | 10/1938 | McMakin | 53—50 |
| 2,457,187 | 12/1948 | Steiner | 221—264 X |
| 2,642,793 | 6/1953 | Heisey | 99—235 |

WALTER A. SCHEEL, *Primary Examiner.*